Patented Dec. 10, 1940

2,224,493

UNITED STATES PATENT OFFICE 2,224,493

HIGH SILICA GLASS COMPOSITION

William C. Taylor, Corning, N. Y., assignor to Corning Glass Works, Corning, N. Y., a corporation of New York No Drawing. Application March 26, 1938, Serial No. 198,324

4 Claims. (Cl. 106—36.1)

This invention relates to glass compositions and has for its object a glass of high silica content having certain special characteristics fitting it for a variety of purposes for which heretofore it has been necessary to use several different types of compositions.

The above and other objects may be accomplished by practicing my invention which embodies among its features a transparent, soda-alumina-silicate glass containing not over 85% $SiO_2$, the sum of the percentages of silica, soda and alumina comprising at least 97% of the glass and being in the proportions 80–85% $SiO_2$, 10–15% $Na_2O$ and 2.5–7.5% $Al_2O_3$.

The desirable characteristics, which make the new glasses particularly suitable for the purpose intended, are a long working or setting range, good chemical durability, a relatively low softening temperature resulting in ease of melting, a moderately low expansion, low power factor, low dielectric constant and low material cost.

By working range is meant the temperature interval through which the glass is sufficiently plastic for working. Obviously the length of the working range is dependent upon the rate at which the viscosity changes with temperature throughout this range and the more slowly the viscosity changes the longer will be the working range. The rate of change of viscosity in the working range for most glasses is sufficiently uniform so that the difference between the temperatures for two given viscosities of a glass affords a convenient measure of such rate for comparative purposes. Two temperatures which may be determined for any glass by methods well known in the art and which have come to be a standard among the physical properties of glasses are the softening temperature at which the logarithm of the viscosity is approximately 7.65 and the strain temperature at which the logarithm of the viscosity is approximately 14.6. Otherwise defined, the softening temperature is that temperature at which a thread of glass .55–.75 millimeter in diameter and 23 centimeters long will elongate at the rate of one millimeter per minute under its own weight when heated throughout the upper 10–15 centimeters of its length. The strain temperature is that temperature below which appreciable permanent strain cannot be established nor removed through plastic flow, and it is measured preferably by the method described by H. R. Lillie in the Journal of the American Ceramic Society, vol. 14, page 505 (1931) in an article entitled "Viscosity of glass between strain point and melting temperature." In the well known soda lime glasses the interval between softening and strain temperatures does not exceed about 220° C. In my new glasses this interval approaches 300° C. as a maximum and is not less than 230° C. Lead glasses which are noted for their slow setting property but are unsuitable for most purposes do not in general exceed a value of 235° C. for this interval. It will therefore be seen that my new glasses have an exceedingly long working range.

The new glasses have a relatively high stability to attack by water, acids and alkalies and are substantially as good and in some cases definitely better in this respect than the average soda lime glass.

A low softening temperature is desirable in order that melting may not be unduly difficult. For the most part the new glasses have softening temperatures well within the range of commercial glasses.

A coefficient of thermal expansion below $.05_8$ is desirable. The glasses of this invention have expansions from about $.05_{50}$ to about $.05_{76}$.

For making communication line insulators a power factor less than 60 is desirable. The power factors of the new compositions range from about 47 to 59.

The lowest dielectric constant which it has been possible heretofore to obtain with prior non-borosilicate compositions is about 6.3 measured at 30 kilocycles. Under these conditions my new glasses have a dielectric constant less than 6 and in some instances as low as 5.82.

The material cost for the new glasses is substantially the same as and in same cases lower than the cost of ordinary soda-lime bottle glasses which do not possess all of the above recited desirable characteristics.

Any and all of these properties may be obtained at the sacrifice of others. The problem solved in this invention has been to obtain them all in one glass.

Ordinary lime glass will not meet all of these requirements and, if borosilicate glasses are resorted to, the increased cost for materials is a very definite handicap. If attempts are made to reach the lower expansion glasses by making a harder lime glass, higher in silica and lower in alkali, trouble is experienced both with melting costs and with devitrification.

I have found that a composition consisting of about 80–85% $SiO_2$, 10–15% $Na_2O$ and 2.5–7.5% $Al_2O_3$ will produce a glass having properties within the range of those recited above, provided that such composition constitutes at least 97% of the glass.

Glasses containing silica, soda and alumina only, while an improvement over lime glass in some respects, are not entirely satisfactory for all the purposes intended. In order to obtain a more useful glass, therefore, I have found it advantageous to use small amounts of either or both fluorine or boric oxide. Other constituents, such as MgO, ZnO or BaO, may be substituted up to 3% without detracting materially from the advantages of this invention.

The following batches are given as illustrations of my new compositions:

Table I

|  | A | B | C | D | E | F | G |
|---|---|---|---|---|---|---|---|
| Sand | 315 | 340 | 350 | 345 | 340 | 338 | 338 |
| Soda ash | 89 | 82 | 80 | 80 | 90 | 100 | 95 |
| Feldspar | 128 | 90 | 95 | 90 | 90 | 88 | 88 |
| Fluorspar | ---- | 20 | 5 | 15 | 15 | 15 | 8 |
| Salt cake | ---- | 1 | 1 | 1 | ---- | 1 | 1 |
| $As_2O_3$ | 2½ | ---- | ---- | ---- | ---- | ---- | ---- |
| Niter | 10 | ---- | ---- | ---- | ---- | ---- | ---- |
| Borax | ---- | ---- | ---- | ---- | ---- | ---- | 20 |

The glasses resulting from the melting of the above batches would have the following compositions, parts by weight per hundred parts of glass if calculated from the respective batches on the customary oxide basis, it being understood, however, that the fluorine remaining in the glass is probably combined as calcium fluoride and/or aluminum fluoride and/or sodium fluoride. The fluorine contents in the following table are recited in the usual manner as being additional to the compositions of the base glasses and represent the maximum parts by weight of fluorine per hundred parts of glass which could be present if no fluorine were lost during melting. The stated properties were measured on samples of the respective glasses.

Table II

|  | A | B | C | D | E | F | G |
|---|---|---|---|---|---|---|---|
| $SiO_2$ | 81.3 | 82.0 | 84.3 | 83.0 | 81.8 | 80.8 | 80.5 |
| $Na_2O$ | 14.3 | 12.0 | 11.8 | 11.7 | 12.9 | 14.0 | 13.9 |
| $Al_2O_3$ | 4.4 | 3.1 | 3.2 | 3.1 | 3.1 | 3.0 | 3.0 |
| CaO | ---- | 2.9 | .7 | 2.2 | 2.2 | 2.2 | 1.2 |
| $B_2O_3$ | ---- | ---- | ---- | ---- | ---- | ---- | 1.4 |
| F | ---- | 2.0 | .5 | 1.5 | 1.5 | 1.5 | .8 |
| Batch cost per pound cents | .53 | .52 | .45 | .48 | .48 | .51 | .58 |
| Power factor | 46 | 47 | 58 | 50 | 49 | 43 | 49 |
| Expansion | .0₅76 | .0₅66 | .0₅63 | .0₅65 | .0₅70 | .0₅75 | .0₅74 |
| Softening temperature | 737 | 732 | 756 | 737 | 708 | 693 | 714 |
| Annealing temperature | 500 | 499 | 507 | 501 | ---- | 476 | 503 |
| Strain temperature | 462 | 469 | 471 | 466 | ---- | 441 | 471 |
| Softness strain difference | 275 | 263 | 285 | 271 | ---- | 252 | 243 |

Batches containing fluorine compounds lose a considerable amount of fluorine on melting and, since the amount of fluorine which remains in the finished glass will vary, depending upon the temperature and time of melting, it is impossible to determine from the batch the exact fluorine content of the glass. The theoretical fluorine content, assuming no loss during melting, can be calculated from the batch as is the case in the above recited compositions, but in order to determine the fluorine content accurately it is necessary to analyze the glass. As an example of the amount of fluorine actually contained in the above compositions, glass B on analysis showed a fluorine content of 1.4 parts by weight per hundred parts of glass. All of the above glasses are clear and transparent, although glasses B to G contain an appreciable amount of fluorine.

A large amount of boric oxide is prohibitive on account of cost and I prefer to use not more than 3%. It has been commonly believed that simple high silica glasses without substantial boric oxide and substantially free from second group oxides and lead oxide would not be practical because they would be too hard to melt, would be chemically unstable and would devitrify readily. Therefore, prior commercial non-borosilicates contained large amounts of second group oxides, and glasses which were substantially free from second group oxides and lead oxide always contained a large amount of boric oxide. Small amounts, up to 3% of second group oxides and boric oxide may be added to my glasses without detracting from their valuable characteristics hereinbefore recited. Glasses according to this invention readily melt at 1500° C., are chemically stable and are substantially free from devitrification difficulties.

I claim:

1. A transparent soda-alumina-silicate glass containing not over 85% $SiO_2$, the sum of the percentages of silica, soda and alumina comprising at least 97% of the glass and being in the proportions 80–85% $SiO_2$, 10–15% $Na_2O$ and 2.5–7.5% $Al_2O_3$, and containing calcium and showing by analysis the presence of fluorine.

2. A transparent soda-alumina-silcate glass containing not over 85% $SiO_2$, the sum of the percentages of silica, soda and alumina comprising at least 97% of the glass and being in the proportions 80–85% $SiO_2$, 10–15% $Na_2O$ and 2.5–7.5% $Al_2O_3$, and containing boric oxide.

3. A transparent soda-alumina-silicate glass containing not over 85% $SiO_2$, the sum of the percentages of silica, soda and alumina comprising at least 97% of the glass and being in the proportions 80–85% $SiO_2$, 10–15% $Na_2O$ and 2.5–7.5% $Al_2O_3$, and containing boric oxide and calcium and showing by analysis the presence of fluorine.

4. A transparent glass which, in terms of parts by weight per hundred parts of glass, consists of about 82 $SiO_2$, 12 $Na_2O$, 3 $Al_2O_3$, 3 CaO, and 1.4 of analytically determined fluorine.

WILLIAM C. TAYLOR.